US008726734B1

(12) United States Patent
Lin

(10) Patent No.: US 8,726,734 B1

(45) Date of Patent: May 20, 2014

(54) SHEAR WAVE GENERATION SYSTEM AND METHODS FOR ULTRASOUND IMAGING

(75) Inventor: Shengtz Lin, Cupertino, CA (US)

(73) Assignee: Sonowise, Inc., San Jose, CA (US)

( * ) Notice: Subject to any disclaimer, the term of this patent is extended or adjusted under 35 U.S.C. 154(b) by 588 days.

(21) Appl. No.: 12/883,143

(22) Filed: Sep. 15, 2010

(51) Int. Cl.
*G01N 29/24* (2006.01)
*G01N 29/34* (2006.01)

(52) U.S. Cl.
USPC .................................................... 73/626

(58) Field of Classification Search
USPC ....................................... 73/625, 626, 602
See application file for complete search history.

(56) References Cited

U.S. PATENT DOCUMENTS

| | | | | |
|---|---|---|---|---|
| 4,841,494 | A * | 6/1989 | Banno | 367/157 |
| 4,868,446 | A * | 9/1989 | Kumada | 310/323.02 |
| 5,115,809 | A * | 5/1992 | Saitoh et al. | 600/459 |
| 5,178,147 | A | 1/1993 | Ophir et al. | |
| 5,517,739 | A | 5/1996 | Kosinski | |
| 5,606,971 | A | 3/1997 | Sarvazyan | |
| 7,223,241 | B2 | 5/2007 | Radulescu | |
| 7,252,004 | B2 | 8/2007 | Fink et al. | |
| 7,578,789 | B2 | 8/2009 | Sandrin et al. | |
| 7,628,754 | B2 | 12/2009 | Matsumura et al. | |
| 7,708,691 | B2 | 5/2010 | Lin | |
| 7,771,355 | B2 | 8/2010 | Lin et al. | |
| 8,016,758 | B2 | 9/2011 | Wu | |
| 8,287,455 | B2 | 10/2012 | Phung | |
| 2005/0248548 | A1* | 11/2005 | Tsumura et al. | 345/177 |
| 2007/0083110 | A1 | 4/2007 | Lin et al. | |
| 2008/0119735 | A1 | 5/2008 | Lin et al. | |
| 2009/0247874 | A1 | 10/2009 | Kim | |
| 2010/0251823 | A1* | 10/2010 | Adachi et al. | 73/606 |
| 2011/0121683 | A1* | 5/2011 | Milyutin et al. | 310/313 B |
| 2011/0184287 | A1 | 7/2011 | McAleavey | |

FOREIGN PATENT DOCUMENTS

| | | | | |
|---|---|---|---|---|
| EP | GB 0173 332 | A2 * | 3/1986 | H03H 9/56 |

OTHER PUBLICATIONS

Freiherr, "Elastography promises big changes in women's care", Diagnostic Imaging 31(2): 1 pg., Feb. 2009.
Bercoff et al., "Supersonic Shear Imaging: A New Technique for Soft Tissue Elasticity Mapping", IEEE Transactions on Ultrasonics, Ferroelectrics, and Frequency Control, 51(4): 396-409, Apr. 2004.
Sarvazyan et al., "Shear Wave Elasticity Imaging: A New Ultrasonic Technology of Medical Diagnostics", Ultrasound in Med. & Biol., 24(9): 1419-35, Nov. 1998.

(Continued)

*Primary Examiner* — Peter Macchiarolo
*Assistant Examiner* — Rose M Miller
(74) *Attorney, Agent, or Firm* — K&L Gates LLP

(57) ABSTRACT

In one aspect the invention relates to a shear wave generator. The shear wave generator includes a first piezoelectric element having a first polarity in electrical communication with a first electrode; a second piezoelectric element having a second polarity in electrical communication with a second electrode, wherein the second polarity is an inverse of the first polarity; a boundary layer disposed behind both the first piezoelectric element and the second piezoelectric element; and an excitation signal generator in electrical communication with the first electrode and the second electrode, wherein the first piezoelectric element vibrates in a first direction and the second piezoelectric element vibrates in a second direction in response to an excitation signal. In one embodiment, the piezoelectric elements are disposed within an ultrasound imaging probe.

9 Claims, 11 Drawing Sheets

(56) References Cited

OTHER PUBLICATIONS

Tanter et al., "Quantitative Assessment of Breast Lesion Viscoelasticity: Initial Clinical Results Using Supersonic Shear Imaging", Ultrasound in Med. & Biol., 34(x): 14 pgs., 2008.
Bercoff et al., "In Vivo Breast Tumor Detection Using Transient Elastography", Ultrasound in Med. & Biol., 29(10): 1387-96, Oct. 2003.
Bercoff et al., "The Role of Viscosity in the Impulse Diffraction Field of Elastic Waves Induced by the Acoustic Radiation Force", IEEE Transactions on Ultrasonics, Ferroelectrics, and Frequency Control, 51(11): 1523-36, Nov. 2004.
Bercoff et al., "Monitoring Thermally-Induced Lesions with Supersonic Shear Imaging", Ultrasonic Imaging, 26: 71-84, Apr. 2004.
Cosgrove et al., "Imaging Shear Waves for Sonoelastography", Imaging Technology News, May 2009.

* cited by examiner

SHEAR WAVE GENERATION SYSTEM AND METHODS FOR ULTRASOUND IMAGING

FIELD OF INVENTION

This invention relates to wave generation, and more specifically to ultrasound systems, devices, and methods using shear waves.

BACKGROUND

Imaging modalities such as nuclear magnetic resonance imaging and ultrasound use various types of waves to interact with a sample of tissue such as mammalian tissue. In the case of ultrasound, mechanical waves in the form of acoustic waves or sound waves are used. Sound waves can propagate as longitudinal waves and shear waves in tissue. The characteristics and use of these wave types have different properties and applications relative to various imaging modalities.

In the case of longitudinal waves, the oscillations occur in the longitudinal direction or the direction of wave propagation. Because compressional and dilational forces are active in these waves, they are also called pressure or compressional waves. They are also sometimes called density waves because their particle density fluctuates as they move. Compression waves can be generated in liquids as well as solids because the energy travels through the atomic structure by a series of compressions and expansion (rarefaction) movements.

In a transverse or shear wave, the particles oscillate at a right angle or transverse to the direction of propagation. Shear waves require an acoustically solid material for effective propagation and, therefore, are not effectively propagated in materials such as liquids or gasses. Shear waves are relatively weak compared to longitudinal waves. In fact, shear waves are usually generated in materials using some of the energy from longitudinal waves. The velocity of shear waves through a material is approximately half that of the longitudinal waves. In addition, in the ultrasound context, the angle in which an ultrasonic wave enters a material determines whether longitudinal, shear, or both types of waves are produced. Shear waves have an inherent polarization direction depending on how they are generated.

These properties of shear waves facilitate their use for various elasticity-related data collection scans with respect to a sample of interest that includes a suitable propagation media. The human body and other tissues satisfy this criterion. To detect the elasticity of a sample of interest such as tissue, various methods exist. However, in light of the various properties and imaging applications of shear waves, in addition to adding to such methods, a need exists to find ways to tailor the shear waves themselves and improve the associated imaging systems that use them.

SUMMARY OF THE INVENTION

Piezoelectric materials such as certain ceramic, crystalline materials, capacitive micromachined ultrasonic transducers (CMUTs), other micromachined ultrasound transducers, and micromachined electromechanical (MEM) transducers are suitable for use in a transducer array. Specifically, such piezoelectric materials can be cut to form a two row multicolumn array, although any suitable n by m array is possible. In one embodiment, a unitary block or piece of piezoelectric material can be cut to form a transducer array or a component row of a transducer array having kerfs filled with a boundary material to define active elements. A kerf refers to a cut, incision, or groove. Electrodes are attached to the piezoelectric elements that make up the array such that each element is electrically addressable using an applied voltage. The kerfs formed in the array can be filled with a suitable lossy material, such as a rubber or a polymer, and the piezoelectric components can be attached to a suitable backing material. Further, flexible electrodes can be attached such that a shear wave-generating transducer array results.

Using the electrodes and suitable switches, the individual transducers that form the array can be selectively addressable such that one or more piezoelectric transducer elements generate a first type of shear wave. Similarly, another group of one or more these elements generates a second type of shear wave that is out of sync from the first shear wave. Alternatively, the two rows of the array can include different types of transducers in each row. For example, the top row of any array may include transducers that have a positive-negative orientation or polarity while the bottom row of transducers may have a negative-positive orientation or polarity. In some embodiments, multiple rows and/or columns of individually or collectively addressable transducer elements can be addressed with an impulse signal such that two or more shear waves are generated. In one preferred embodiment, these shears waves have different phases with substantially the same or different amplitudes. By selectively controlling the types of shear waves sent and how they are received by the array, greater flexibility and more options are made available to the user of such a system.

In one aspect the invention relates to a shear wave generator. The shear wave generator includes a first piezoelectric element having a first polarity in electrical communication with a first electrode; a second piezoelectric element having a second polarity in electrical communication with a second electrode, wherein the second polarity is an inverse of the first polarity; a boundary layer disposed behind both the first piezoelectric element and the second piezoelectric element; and an excitation signal generator in electrical communication with the first electrode and the second electrode, wherein the first piezoelectric element vibrates in a first direction and the second piezoelectric element vibrates in a second direction in response to an excitation signal. In one embodiment, the piezoelectric elements are disposed within an ultrasound imaging probe. The boundary layer can include a lossy material. The lossy material can include a high acoustic attenuation material. The first piezoelectric element and the second piezoelectric element can be positioned to define a kerf therebetween. In one embodiment, the first piezoelectric element has a first wave generating surface and the second piezoelectric element has a second wave generating surface, the first and second wave generating surfaces aligned and sized such that a shear wave is generated in response to an excitation signal. The wave generator can further include a plurality of the first and second piezoelectric elements arranged to form an array having rows and columns, each row and column comprising a plurality of the first and second piezoelectric elements, wherein at least two of the columns define a kerf therebetween. In one aspect, the array includes a plurality of piezoelectric hexahedrons arranged in a grid that define kerfs therebetween that may be filled with a boundary material or remain unfilled. Rows and columns of the grid sandwich the boundary material in one embodiment.

In another aspect, the invention relates to an ultrasound probe. The probe includes a transducer array that includes a layer of lossy material; a first plurality of piezoelectric elements arranged in a first row; and a second plurality of piezoelectric elements arranged in a second row, the lossy material disposed behind the first row and the second row, the first row disposed above the second row and each row aligned to form a transducer array such that one of the first plurality of piezoelectric elements is aligned with one the second plurality of piezoelectric elements. The ultrasound probe can further include a plurality of electrode pairs, each pair attached to a plurality of each of the first and second plurality of piezoelectric elements; and a switch in electrical communication with at least one electrode pair, the switch configured to selectively send an excitation signal to the at least one electrode pair. Each piezoelectric element has one of two different polarities in one embodiment. In one embodiment, the first plurality of piezoelectric elements has a positive-negative polarity. A subset of the first plurality of piezoelectric elements has a negative-positive polarity in one embodiment. In one embodiment, a subset of the second plurality of piezoelectric elements has a negative-positive polarity. A subset of the second plurality of piezoelectric elements has a positive-negative polarity in one embodiment. The layer of lossy material can include a high acoustic attenuation material. In one embodiment, each piezoelectric element in the first row is adjacent to a kerf having lossy material disposed therein.

In one aspect, the invention relates to method of generating a shear wave. The method includes generating a first shear wave component from a first transducer element having a first polarity, generating a second shear wave component from a second transducer element having a second polarity, the first transducer element disposed above the second transducer element and aligned thereto, combining the first and second shear wave components to generate a combined shear wave, and detecting a property of interest with respect to a sample of interest using the combined shear wave. In one embodiment, the property of interest is an elasticity measurement. The combined shear wave propagates in the sample of interest in one embodiment. The first polarity is opposite the second polarity in one embodiment.

In yet another aspect, the invention relates to a shear-wave based ultra sound imaging system. The system includes an ultrasound probe that includes a first plurality of addressable transducers, each transducer having a first sample facing surface and a first backing material facing surfacing, each transducer comprising a first electrode, and a second plurality of addressable transducers, each transducer having a second sample facing surface and a second backing material facing surfacing, each transducer comprising a second electrode, the second plurality of addressable transducers attached to the backing material and stacked upon and aligned with the first plurality of addressable transducers; and an excitation signal generating circuit connected to one of the first or second electrodes, the circuit suitable for causing a shear wave to propagate from at least one of the first or second plurality of addressable transducers. In one embodiment, each first sample facing surface is aligned with each second sample facing surface. The first plurality of addressable transducers can include a plurality of piezoelectric elements with a plurality of kerfs adjacent thereto, each kerf filled with a boundary material such that each transducer is formed from a portion of a piezoelectric material disposed between two portions of the boundary material. The system can further include a processor in electrical communication with the circuit, the processor programmed to selectively address the first plurality of addressable transducers such that a polarity associated with each addressable transducer changes between a receiving state and a propagating state of the probe. Each addressable transducer has one of two different polarities in one embodiment. A subset of the first plurality of addressable transducers has a positive-negative polarity in one embodiment. A subset of the second plurality of addressable transducers has a negative-positive polarity in one embodiment.

In one aspect, the invention relates to a computer-implemented system for collecting ultrasound data. The system includes an electronic memory device, and an electronic processor in communication with the memory device, wherein the memory device comprises instructions that when executed by the processor cause the processor to: control a first group of ultrasound transducer elements having a first signal transmit state and a first signal receive state such that a first shear wave component is generated; control a second group of ultrasound transducer elements having a second signal transmit state and a second signal receive state such that a second shear wave component is generated; select the first transmit state and the second transmit state such that each transmit state has the same polarity or an opposite polarity; and select the first receive state and the second receiving state such that each receive state has the same polarity or an opposite polarity. In one embodiment, the first group is stacked upon and aligned with the second group to form a transducer array disposed in an ultrasonic imaging probe.

In one aspect, the invention relates to a method of manufacturing an ultrasound transducer array. The method includes providing a piezoelectric material; cutting the piezoelectric material in a first direction to form a first section and a second section; reversing the polarities of the first section and the second section, such that the first section has a positive polarity and the second section has a negative polarity; attaching the first section and the second section to a backing material, the first section and the second section being adjacent and substantially parallel; and cutting the first section and the second section in a second direction, the second direction being substantially perpendicular to the first direction, thereby forming a plurality of polarized transducer elements. In one embodiment, cutting the first section and the second section in a second direction forms a kerf, and the method further comprises disposing a lossy material in the kerf.

This Summary is provided merely to introduce certain concepts and not to identify any key or essential features of the claimed subject matter.

BRIEF DESCRIPTION OF DRAWINGS

The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Figure 1A:
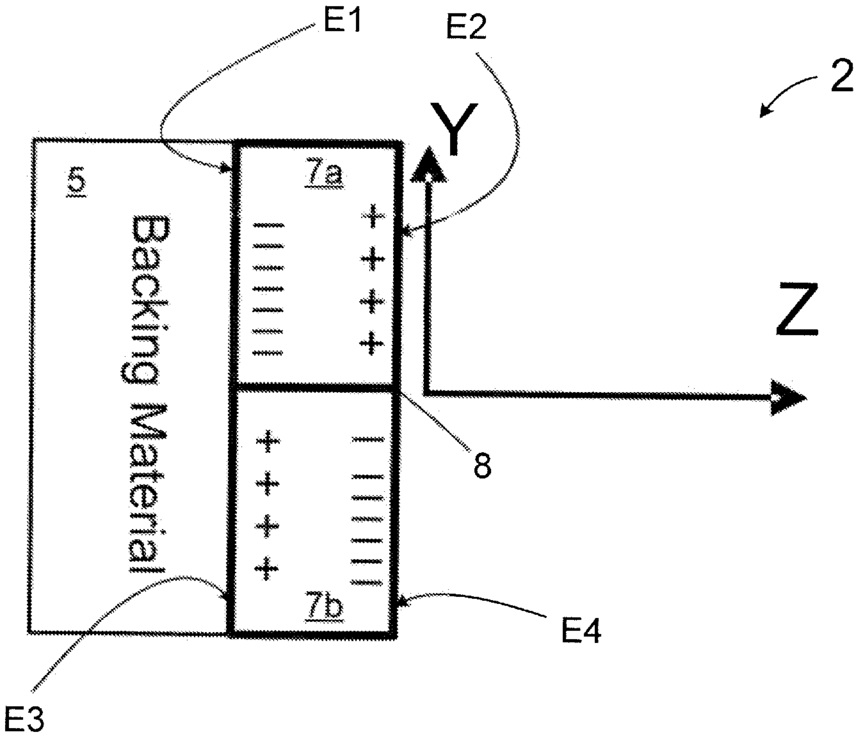
FIG. 1A shows a cross-sectional view depicting a transducer-based shear wave generating device having two piezoelectric components having opposite polarities or electrical configurations, in accordance with an illustrative embodiment.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

In general, embodiment of the invention relate to systems, method, and devices for enhancing shear wave generation and the use of shear waves in the context of various imaging modalities. In a preferred embodiment, the invention relates to the arrangements and configurations of transducer groups or pairs having a particular sequence of polarities or poling directions such that shear waves are generated and received in a controlled manner. In order to tailor shear waves such that they have desirable characteristics, a wave generator is used. Similarly, the same transducer array used in the generator can be used as a shear wave receiver when the incident waves return in a modified form as a result of their propagation. The modified control and arrangement of the transducers and their components as described herein allows for improved shear wave signal to noise ratios and consistency and other enhancements for imaging modalities such as ultrasound elastography are possible The invention relates to methods, systems, and devices for using shear waves to collect data and tailor the properties of individual shear waves or shear wave generators. In one preferred embodiment, invention relates to methods, systems and apparatus of generating shear waves on a transducer array for medical elastography ultrasound imaging. Elastography is an analysis technique by which soft tissues are analyzed to detect tissue anomalies such as a tumor. More generally, elastography refers to techniques suitable for detecting the elasticity of one or more tissue types. In one embodiment, tissue strain or stress is used in conjunction with an input wave for a given elastography data collection session. Preferably, shear waves are used as the type of input wave.

In one embodiment, a shear wave changes the medium through which it propagates, such as, without limitation, fat, muscle, cartilage and other tissue, to change its shape but not its volume or density. A shear wave is a type of transverse wave that occurs in an elastic medium when it is subjected to periodic shear. A shear is the change of shape, without change of volume, of a layer of the substance, produced by a pair of equal forces acting in opposite directions along the two faces of the layer. If the medium is elastic, the layer will resume its original shape after shear, adjacent layers will undergo shearing, and the shifting will be propagated as a wave.

There are certain advantages associated with using shear waves relative to the other approaches. These advantages include correlating the tissue elasticity with a particular disease state, pathology or other condition of interest in a given sample. In part, one embodiment of the invention combines alternate phase of one or more shear waves or shear wave components using one or more transducer arrays such that the shear waves or a shear wave component are out of phase with each other. Thus, in one embodiment, a single shear wave is generated from two or more shear wave components having different phases. The combination of the waves is such that selective constructive and destructive interference or wave superposition occurs relative to the shear waves which improve the signal to noise ratio when performing an elastography or other ultrasound scan using such a wave combination. Accordingly, embodiments of the present invention are especially suitable for ultrasound imaging, such as 3-Dimensional (3D) ultrasound imaging or panoramic imaging. The transducer wave can generate a longitudinal wave with the shear wave components or an individual shear wave generated from component waves such that imaging and elasticity measurements can be performed simultaneously.

The application is based in part on the discovery that ultrasonic imaging can be enhanced by using a shear wave generated by a two-dimensional transducer array having a plurality of individually polarizable transducers. The plurality transducers in the array are arranged in two dimensions along the length of the array. The properties of the shear wave can be controlled by arranging the transducers based on their polarity and/or by addressing substantially identical transducers with inverted or opposite signals. In preferred embodiments, the transducers are arranged in heterogeneously polarized or polarizable groups.

For example, at least one transducer in each group has a first polarity or poling direction and at least one transducer in each group has an opposite second polarity or poling direction. These characteristic may apply relative to one or both of the wave-generating or wave-receiving states. Accordingly, all of the transducers may have the same polarity when generating a wave, but may be selectively switched to have differing polarities when receiving an incident shear wave. Likewise, in the transmitting or receiving state, all of the transducers may have the same polarity, but may have differing polarities in the wave generation state. Combinations of both of these scenarios and many others are also possible.

A plurality of transducers having piezoelectric components can be aligned and are either of substantially the same polarity or have opposite polarities. Typically, the polarity is associated with a block or other shaped volume of piezoelectric material used to form a transducer. As used herein, polarity refers to an electrical or physical change in transducer or the underlying piezoelectric element disposed therein along a direction such as the elevation or short axis direction. Thus, contraction along one direction can have a positive (or negative) polarity while expansion along the same direction can have a negative (or positive) polarity.

For example, a plurality of transducers, for example, sixteen substantially identical transducers, can be arranged in an 8×2 array. These transducers each have an electrical connection that can be selectively addressed with either a positive or negative signal. Thus, the first eight transducers, or first group, may be addressed in a positive manner while the next eight transducers, or second group, may be addressed in a negative matter. The two groups can be arranged as two rows that are stacked on top of each other to form the 8×2 array. Such as array can be visualized as follows when looking into the sample facing surface of the transducer:

++++++++
−−−−−−−−

As shown above, a first plurality or group of transducer elements having a positive polarity are stacked upon and aligned with a second plurality or group of transducer elements having a negative polarity. As an alternative way of describing the array, each vertical group or column can also be viewed as a set of transducer pairs such that one element in the pair is addressed in a positive manner or experience a positive expansion or first poling state in response to an impulse signal. Similarly, the second element in each pair is addressed in a negative manner or experiences a negative compression or second poling state in response to an impulse signal. In one embodiment, the indication of + and − signs in a given figure indicates the relative position of a positive or a negative electrode suitable for generating a voltage across a piezoelectric material such that its expansion or contraction occurs along a given direction or axis. As shown above, alternating electrical configurations for vertical (or elevation) transducer elements are shown. Accordingly, the top or first row would generate a first shear wave having a first waveform and the bottom or second row would generate a second shear wave having a second waveform.

In other embodiments, a group of transducer elements having the same configuration can be positioned relative to a group of transducer elements having an opposite configuration. An example of this is as shown below:

+++++−−−−−
−−−−−+++++

As discussed elsewhere herein, independent of the polarity of a given piezoelectric element/transducer within a given transducer array, by changing the voltage relative to the electrodes attached thereto, any given material can be selectively addressed independent of its inherent polarity. Thus, by changing the applied voltage, the poling characteristics of the example illustrated above can be inverted.

The polarity of the transducer also can be alternated along the length of the array. Again referring to an 8×2 array, the first pair of transducers can have an upper transducer with a positive polarization and a lower transducer with negative polarization (+−). The next or adjacent pair of transducers can have an upper transducer with a negative polarization and a lower transducer with a positive polarization (−+). These different types of transducer pairs can be combined to create a sequence. The sequence can be alternating or patterned. These patterns allow for different shear waves to propagate in a sample of interest.

With a conventional array, the acoustic wave emitted from each element is assumed to propagate towards and through the sample. In the tissue, the waves from the array form a constructive and destructive field pattern, according to the principle of time delayed beam forming. Time delayed beam forming refers to delaying the signal burst for each element according to the wave velocity, and forming a constructive interference at the focus area. With respect to an exemplary embodiment, splitting the piezoelectric element in the elevation direction into two rows and making the phase of the each wave generated from each split element different, results in wave propagation in the sample that is the vector sum of two acoustic forces, one force from each split piezoelectric element. As a result of the arrangement of transducer elements having opposite polarities, a strong shear wave is created along with a longitudinal wave. The longitudinal wave is used for the conventional ultrasound imaging.

FIG. 1A is a two dimensional schematic diagram that depicts a cross-section of a component of a transducer-based shear wave generating device 2 having a pair of piezoelectric elements. The device 2 includes a backing material or backing block 5. This backing material can include a lossy material to absorb the acoustic energy to increase the bandwidth of the array. In general, the backing layer is used, in some embodiments, to absorb energy entering the transducer array. An upper or first piezoelectric component or element 7*a* is shown attached to or otherwise positioned relative to the backing block 5. Similarly, a lower or second piezoelectric component or element 7*b* is shown attached to or otherwise positioned relative to the backing block 5, as shown.

These first and second piezoelectric elements and the backing material form a transducer array 2 or a portion thereof. This cross-section is of a vertical element or column with two distinct wave generating/wave receiving functions to the piezoelectric elements 7*a* and 7*b*. Typically, these features are suitable for use in various ultrasound imaging modes such as the pulse imaging mode. In one embodiment, piezoelectric elements 7*a* and 7*b* considered together are referred to individually and together as an active element or active elements.

A polymer filled kerf or volume 8 is also shown as one boundary between the two elements 7*a* and 7*b*.

Figure 1B:
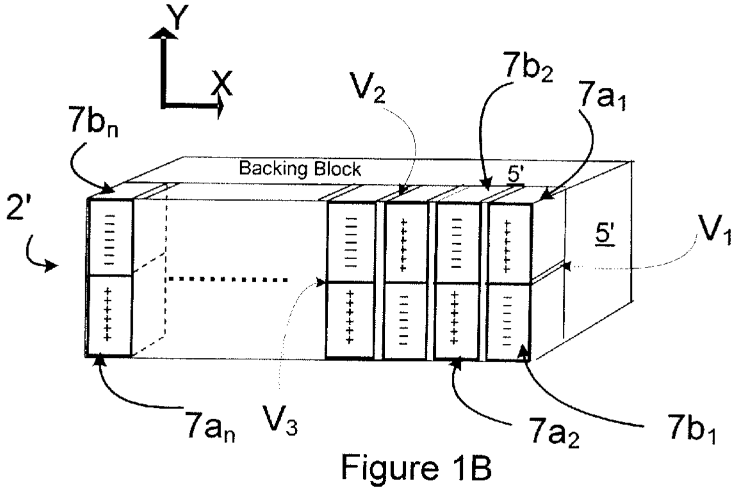
FIG. 1B shows a perspective view of a transducer array with shear wave generating properties, in accordance with an illustrative embodiment.
Figure 1C:
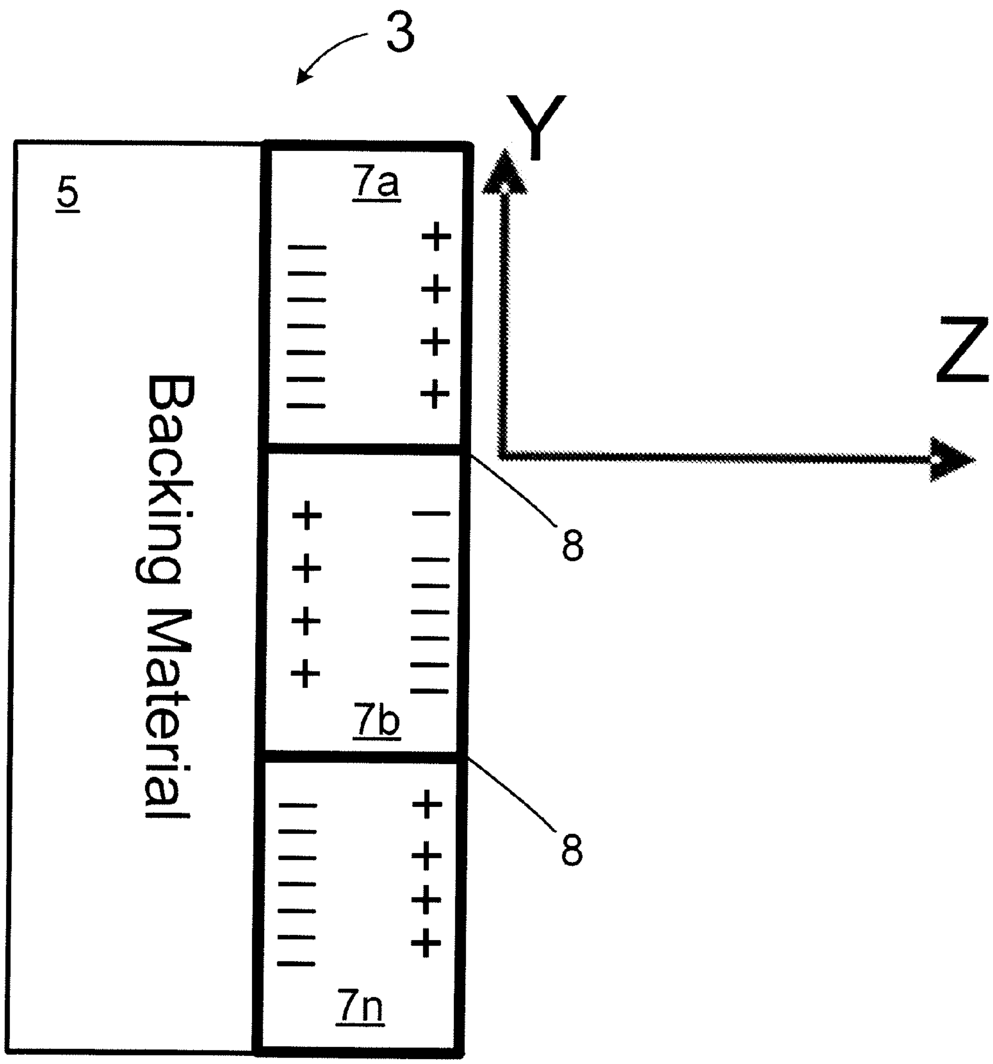
FIG. 1C shows a cross-sectional view depicting a transducer-based shear wave generating device having three piezoelectric components having alternating polarities or electrical configurations, in accordance with an illustrative embodiment.

As shown, a first set or pair of electrodes E1, E2 suitable for transmitting an excitation signal or other signal to the piezoelectric element 7*a* is also shown. In addition, a second set or pair of electrodes E3, E4 suitable for transmitting an activation signal or other signal to the piezoelectric element 7*b* is shown. In a preferred embodiment, these electrodes are flexible. Each element 7*a* and 7*b* can be selectively addressed to control its polarity during one or both of a wave generating state or a wave receiving state. FIG. 1B shows a three-dimensional perspective view of a transducer array 3. In turn, FIGS. 1A and 1C show alternative embodiments with transducer arrays suitable for generating shear waves.

In addition, FIG. 1B shows a transducer array 2' that includes a plurality of individual hexahedral piezoelectric elements. These are disposed adjacent to a backing material 5'. The backing material may be a hexahedron to which the piezoelectric elements are attached. Two types of such piezoelectric elements are shown. The first type, generally 7*a* has a positive polarity while the second type 7*b* has a negative polarity. As shown, two groups of these elements $7a_1$ through $7a_n$ and $7b_1$ through $7b_n$ are shown. Two rows are shown with individual columns that include a pair each of a 7*a* type element and a 7*b* type element. Each of the rows sandwiches a lossy material such as a rubber or polymer material. In turn, each of the columns sandwiches a lossy material which may be the same or different from that between the two rows. Specifically, as shown, in the perspective view of the device 2' of FIG. 1B, various kerfs or volumes $V_1$, $V_2$, and $V_3$ sandwiched between a plurality of such piezoelectric elements are shown. The volumes or kerfs can be filled with layers or regions of a lossy material or other materials.

Returning to the cross-sectional view of FIG. 1A, the two piezoelectric elements or active elements 7*a*, 7*b* have opposite polarity or electrode orientations. For example, relative to the backing material, the poling or electrode orientation is negative (−) to positive (+) for the first active element 7*a*. In contrast, the poling or electrode orientation is positive (+) to negative (−) for the second active element 7*b*.

The array can include any suitable number of transducers. For example, an array could include 2-row transducers in a preferred embodiment. However, the number of rows is not limited. In some embodiments, the transducers are arranged into grids having rows and columns. For example, the transducers can be arranged in 2×2, 2×3, 2×4, 64×64 or other N×M arrays (wherein N×M are whole numbers). In one embodiment, a 64×64 array can be used with ceramic piezoelectric and 1000×1000 or higher arrays can be used for cMUT, MEM, and other transducer types, depending on the intended application. Flexible electrodes can be attached to each addressable transducer element in a positive-negative (+−) or negative-positive (−+) electrode configuration.

The property by which the individual transducer elements move or vibrate in particular direction in response to an applied voltage or an electric field of a given direction can be referred to as the polarity or polarization of the transducer element. The poling direction of a given transducer element refers to the direction that the length will compress or expand when applying voltage or a change in voltage that will occur when a returning wave impinges on the transducer or as a result of another applied force. When a receiving wave impinges on the array, voltages or other electrical values are generated, which can be stored and processed.

FIG. 1C shows a two dimensional schematic diagram that depicts a cross-section of a component of a transducer-based shear wave generating device 3 having n transducers in each column. This cross-section is of a vertical element or column with three distinct wave generating/wave receiving sections. In this embodiment, the transducers have alternating polarities. That is, relative to the backing material, the polarity or electrode orientation is negative (−) to positive (+) for the first transducer 7*a*, positive (+) to negative (−) for the second transducer 7*b*, and negative (−) to positive (+) for the nth transducer 7*n*.

Figure 1D:
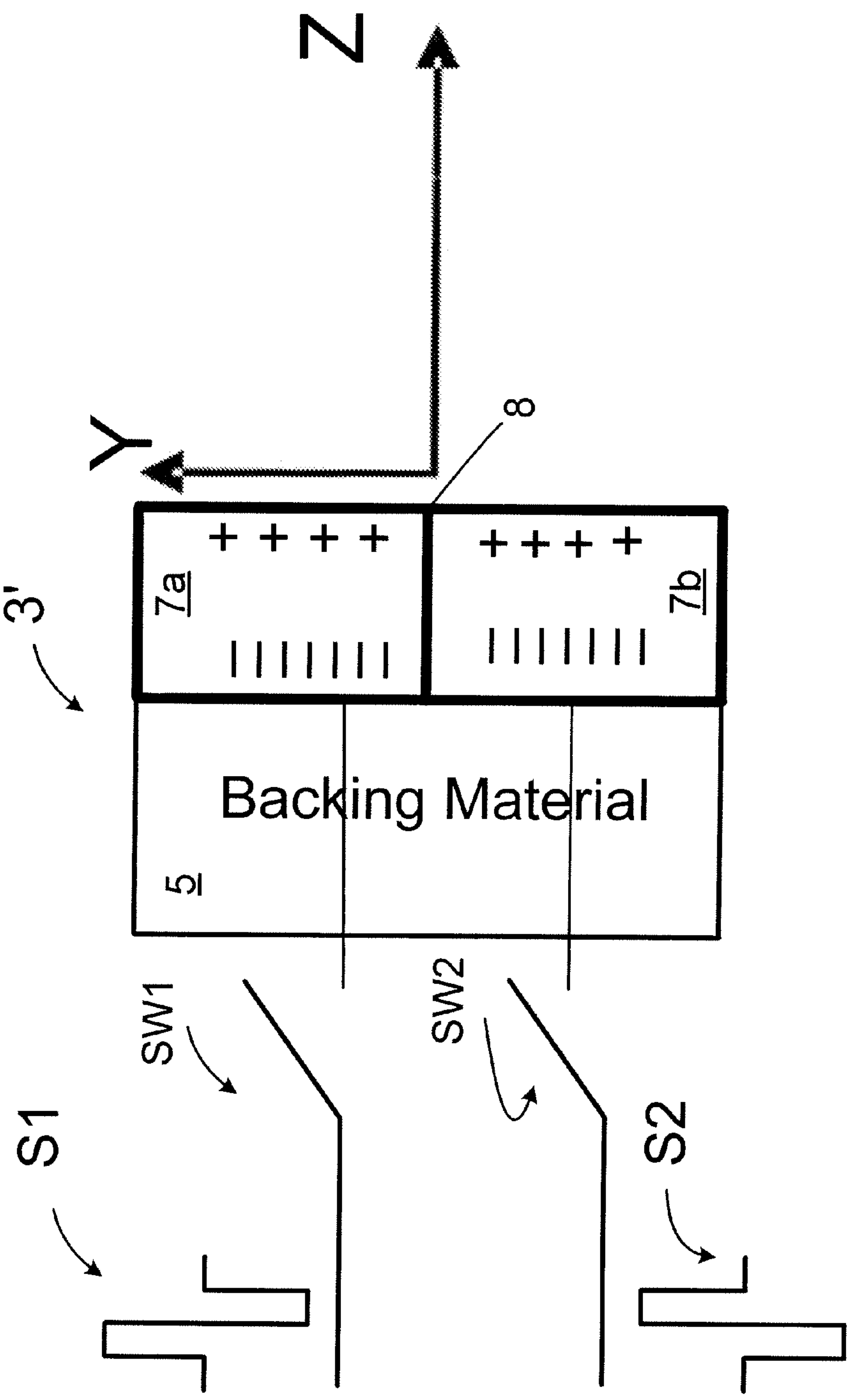
FIG. 1D shows a cross-sectional view depicting a transducer-based shear wave generating element having two piezoelectric components having the same polarity or electrical configuration, but driven by inversed phase signal in accordance with an illustrative embodiment.

Transducer waves of similarly polarized transducer elements also can be modulated by selectively switching or inverting the applying signal for each transducer. FIG. 1D is a two dimensional diagram that depicts a cross-section of a transducer-based shear wave generating device 3' having a pair of transducer elements. A first and a second polymer filled kerf 8 are also shown as a boundary between two adjacent transducer elements or rows of elements.

As shown FIG. 1D, the transducer elements are polarized in the same direction. In other words, relative to the backing material, the polarity or electrode orientation is negative (−) to positive (+) for the first active element 7*a* and is also negative (−) to positive (+) for the second active element 7*b*. However, by addressing each transducer element with opposite or inverted (i.e., positive and negative) signals S1, S2, the transducers can generate different types of shear waveforms. Specifically, based on the input signals S1 and S2, the shear waves would have the same amplitude but opposite phase.

As shown in FIG. 1D, the signal S2 has substantially the same or the same waveform of signal S1 with an inverted voltage. Two switches, SW1 and SW2, are also shown. These switches allow for the transducers to be selectively activated in response to the input signals. In addition, these switches can also be used to regulate the timing of the input signals such that shear waves can be selectively produced in sync or out of phase with each other by a predetermined phase shift. The switches can include one or more transducer elements. The switching of the input signals used to control the array or transmit and excitation signal can include various switching circuits such as transistor or semiconductor based circuits or controllers.

The transducer elements can be of various suitable materials such as different types of crystalline materials. In some embodiments, the transducers are made of a piezoelectric material. One preferred piezoelectric materials is lead zirconate titanate (PZT). Other suitable materials for use in the active elements can include cMUT, PZT MEM, and others.

With respect to the FIGS. 1A, 1C, and 1D, the two dimensional cross-section is oriented relative to a Y-Z axis such that the X-axis (not shown) is perpendicular thereto. In some instances, the Y-axis is also referred to as the elevation axis or along the elevation direction. In turn, the Z-axis or beam axis is the direction along which the shear waves propagate from the piezoelectric elements into a sample of interest. Accordingly, an elevation plane or YZ plane may also be referenced. For example, a shear wave propagating with an upper and lower wave component in the elevation plane has an associated elevation plane wave.

Figure 2B:
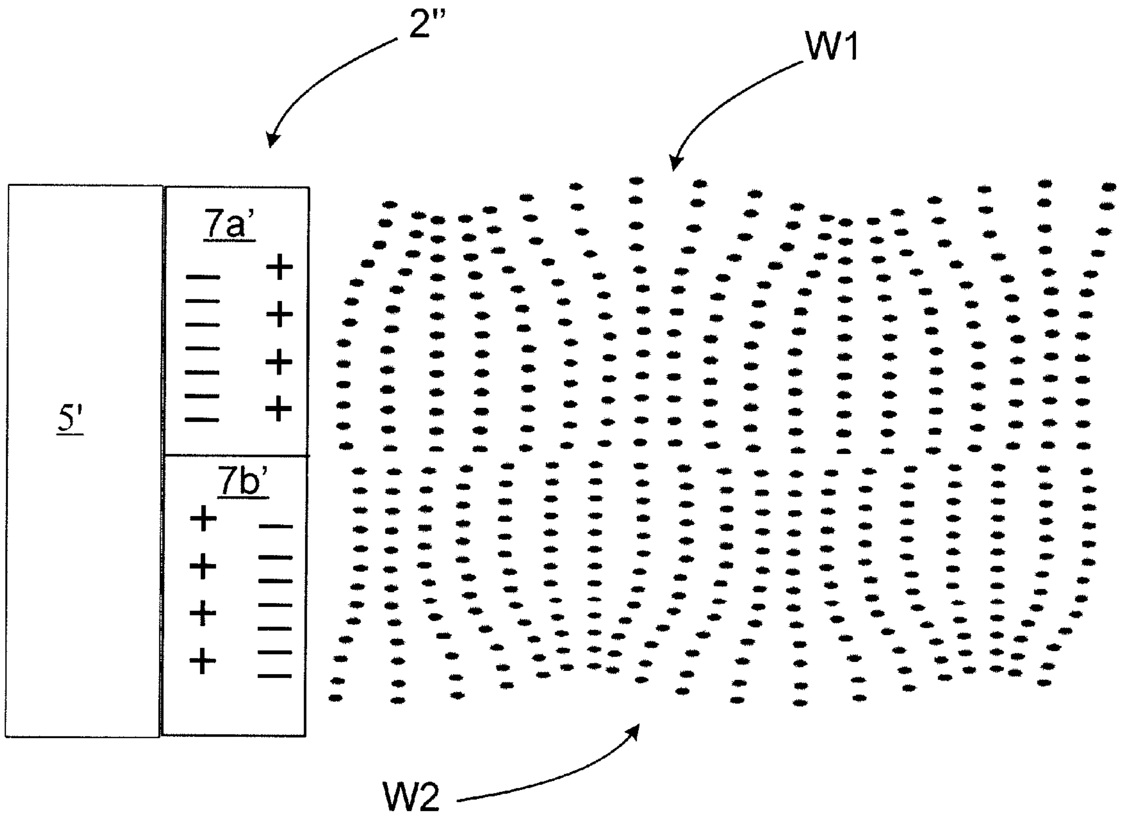
FIG. 2B is a two-dimensional schematic depicting a shear wave generating element and a plurality of shear waves, in accordance with an illustrative embodiment.
Figure 3:
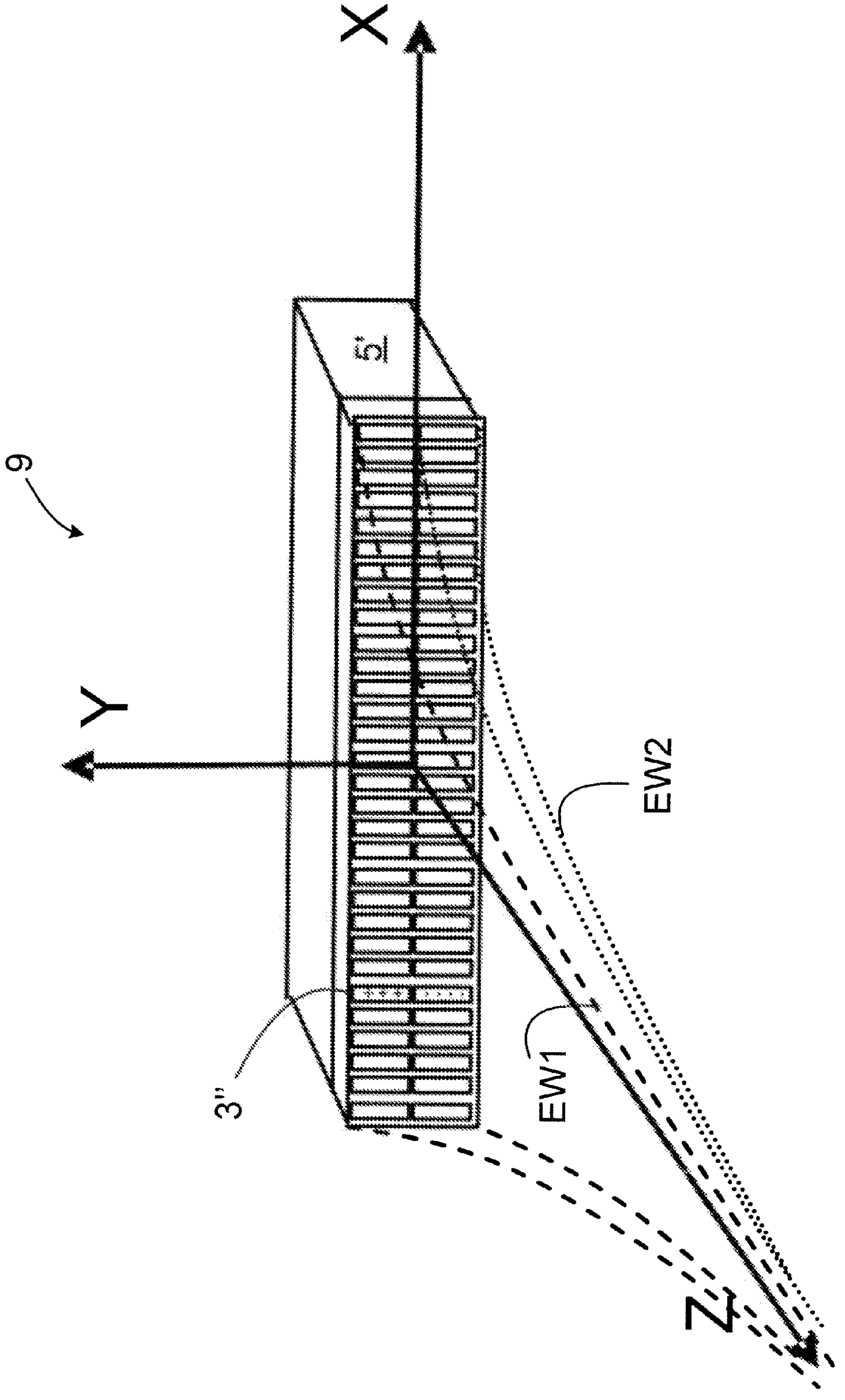
FIG. 3 shows a perspective view of a transducer array with shear wave focusing properties, in accordance with an illustrative embodiment.

Although more relevant to FIG. 3 which shows the X-axis or azimuth axis, a shear wave also has an azimuth plane wave relative to the XZ or azimuth plane. The beam scanning direction for a given ultrasound data collection event occurs along the X-axis, as shown in FIGS. 1D and 2B. In one embodiment, scanning can proceed along the positive or along the negative direction of the X-axis or both directions simultaneously in a 2-dimensional array.

Figure 2A:
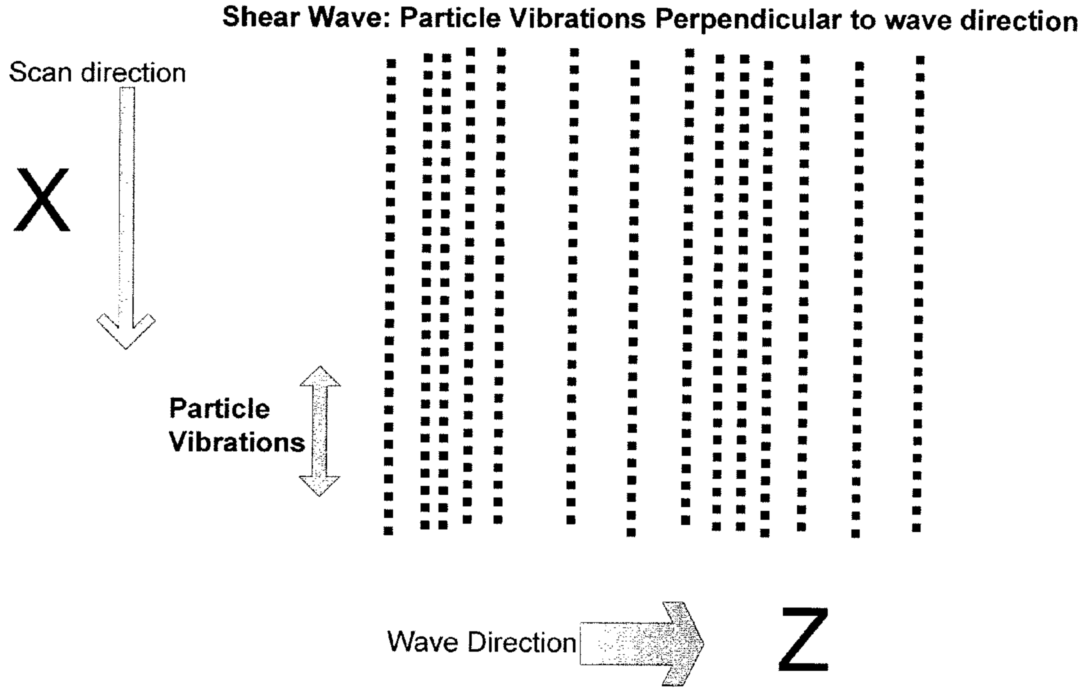
FIG. 2A shows a two dimensional view of shear wave propagation, in accordance with an illustrative embodiment.

FIG. 2A shows an exemplary shear wave profile. An exemplary scan direction is shown, and various characteristics of a shear wave's direction and movement in a sample of interest are shown. A shear wave such shown in FIG. 2A can propagate from a single piezoelectric element as a shear wave component that combines with other such components to form an overall shear wave. Alternatively, the overall shear wave produced by the arrays described herein can have characteristics in common with the waveform shown in FIG. 2A. For example, as shown in FIG. 2B, a first shear wave component propagates from the upper piezoelectric element 7*a*' while a second shear wave component propagates from the bottom piezoelectric element 7*b*'.

FIG. 2B shows a perspective view of an alternative embodiment of the shear wave generating device of FIG. 1A. For context, relative to FIG. 2B, an overall device 2' is analogous to the device section 2 shown in FIG. 1A.

As shown in FIG. 2B, a wave generating and receiving device 2" includes a backing material 5' and a plurality of transducers having active elements 7*a*', 7*b*' facing a common scanning direction of interest. The transducers are used both to propagate waves or portions of waves and to receive the same. A combined shear wave having components W1 and W2 generated from each respective active element 7*a*' and 7*b*' is shown. As shown, this array is split in the elevation direction into multiple transducers, and the polarity of these transducers can alternated. Each active element 7*a*' and 7*b*' responds to an incident excitation pulse such that shear waves result from the correlated movement or vibration of the active elements. The excitation pulses are transmitted using electrodes attached to each respective active element.

Typically, a control switch or switches are part of a control circuit connected to each active element. In one embodiment, the control of the transmitting and receiving switches is performed independently. Accordingly, in one configuration, a plurality of elevation-axis disposed active elements has a certain polarity when transmitting, and another polarity when receiving. For example, in a two active element device such depicted in FIG. 1A wherein the elements are arranged along the elevation axis, both elements can be at the same polarity in the transmit state, and a reverse polarity in a receive state, or use one of the two elements for transmitting, and both elements in the receiving state.

The various embodiments including different configurations of piezoelectric elements are suitable for use with various types of data collecting probes that use shear waves. For a transducer array-based ultrasound probe, the sound that emanates from an ultrasonic transducer originates from many points along the surface of the piezoelectric element. The shear wave profile generated by a given transducer element is dependent upon the transducer's polarity or the polarity of the applying signal. This can result in a sound field with many waves interacting or interfering with each other. When waves interact, they superimpose on each other, and the amplitude of the sound pressure or particle displacement at any point of interaction is the sum of the amplitudes and phase of the multiple individual waves.

Similarly, when they are in phase (so that the peaks and valleys of one are exactly aligned with those of the other), they combine to double the displacement of either wave acting alone. In turn, when they are completely out of phase (so that the peaks of one wave are exactly aligned with the valleys of the other wave), they combine to cancel each other out. When the two waves are not completely in phase or out of phase, the resulting wave is the sum of the wave amplitudes for all points along the wave. The embodiments shown in FIGS. 1A, 1B, 1C, 2, and 3 transmit more than one type of shear wave that combines with at least one other shear wave to constructively and destructively combine such that a tailored shear wave results. The superimposed wave that is generated because of this arrangement will include the original longitudinal wave plus an enhanced shear wave.

FIG. 3 shows a perspective view of a transducer array 9 with wave focusing properties that are modified by altering the beam forming delay profile in accordance with an illustrative embodiment. As shown in the figure, a single pair of active elements 3" corresponding to the cross-sectional view of FIG. 2 are stacked on top of each other. This pair is a subset of a larger set or plurality of transducer elements in the same row. The top element of the pair has a positive polarity and the bottom element in the pair has a negative polarity. These two elements are formed by cutting one length of piezoelectric material in half and filling the kerf between the two adjacent halves with a suitable material. Although only one active element pair 3" is identified, it is clear from the embodiment that two rows that include a plurality of such elements are positioned relative to a blocking material 5' to form the array 9. The overall array 9 is included in a probe as discussed below in one embodiment. The top row of the transducer array includes a first plurality of active elements that transmits a first shear wave EW1. Similarly, the bottom row of the transducer array includes a second plurality of active elements that transmits a second shear wave EW2. These waves combine to produce the conventional longitudinal wave with an enhanced shear wave by compressing the tissue media with different phase of the acoustic force for ultrasound data collection purposes.

Transducer Design and Arrangement

In one embodiment, a strip or block of poled piezoelectric element is cut to one-half the desired elevation length. Each of half of the cut strip or block has an inverse or opposite polarity relative to the other half. These two halves, shown as top and bottom rows of piezoelectric elements, shown in exemplary form in FIG. 1B, form groups of pair of active elements such as elements $\mathbf{7}a_1$ and $\mathbf{7}b_1$. To increase the energy yield from the transducer, an impedance matching layer is placed between the active element and the face of the transducer. In one preferred embodiment, impedance matching is achieved by sizing the matching layer so that its thickness is ¼ of the desired wavelength of the resonate frequency. This ensures that waves that were reflected within the matching layer remain in phase when they exit the layer.

For contact transducers, the matching layer is made from a material that has an acoustical impedance that ranges between the acoustical impedance of the active element and the acoustical impedance of the tissue. More than one matching layer can be used, if desired. Contact transducers also incorporate a Room Temperature Vulcanizing (RTV) lens to protect the matching layer and active element from scratching. The device can further include an acoustic lens to focus or direct the sound waves generated by the transducer array.

The backing material supporting the piezoelectric material used in the active element influences the damping characteristics of a transducer. Using a lossy backing material with an impedance similar to that of the active element will produce the most effective damping. Such a transducer will have a wider bandwidth resulting in higher resolution. As the mismatch in impedance between the active element and the backing material increases, material penetration and resolution increase, but transducer sensitivity is reduced.

According to some embodiments of the present invention, there is an ultrasound system that includes a probe. For example, the ultrasound system may be any conventional ultrasound system. For example, the ultrasound system may be a 3D ultrasound system. For example, the probe may be a freehand "easy 3D" probe that is meant to be moved in translational motion in the YZ direction across body tissue.

Figure 4:
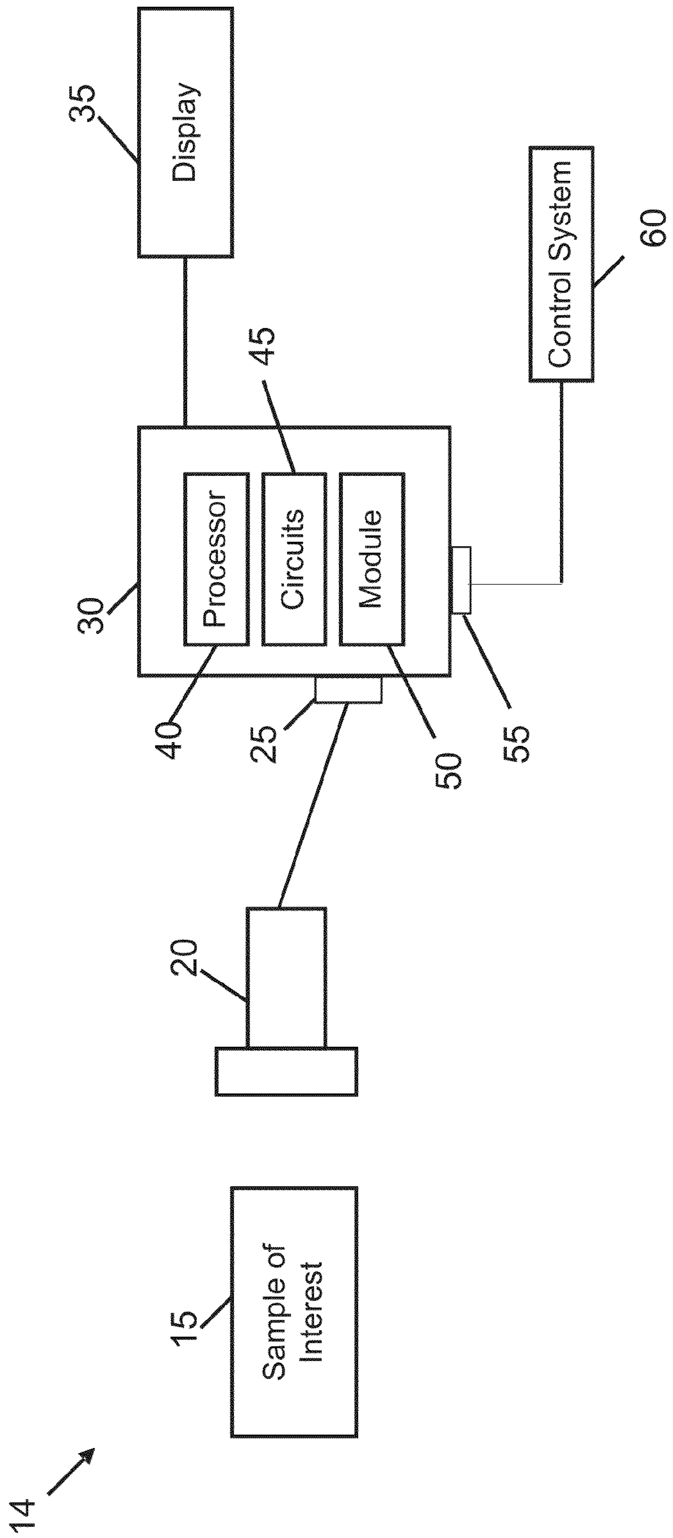
FIG. 4 shows an ultrasound data collection system that includes a plurality of shear wave generating components, in accordance with an illustrative embodiment.

FIG. 4 is a schematic diagram of an ultrasound system 14 according to a particular embodiment of the present invention. The system is suitable for collecting data from a sample of interest 15 such as tissue. An ultrasound system 14 includes probe 20, a probe port 25, a data collection and signal generating system or processing system 30, and a display 35. The processing system includes a computer or processor 40. Electronic components and/or circuits 45 for selectively addressing a transducer array disposed in the probe are also included. The array comprises a plurality of individual transducer elements. The processing system 30 also includes a transducer signaling software application or module 50. In one embodiment, this module is suitable for generating conventional longitudinal waves in conjunction with different types of shear waves and processing data generated in response to such shear waves. The controls for the overall system 14 can be a shown on the display and accessible by touch or other input device. Alternatively, another input device or control system 60 can be attached via a control port 55.

Figure 5:
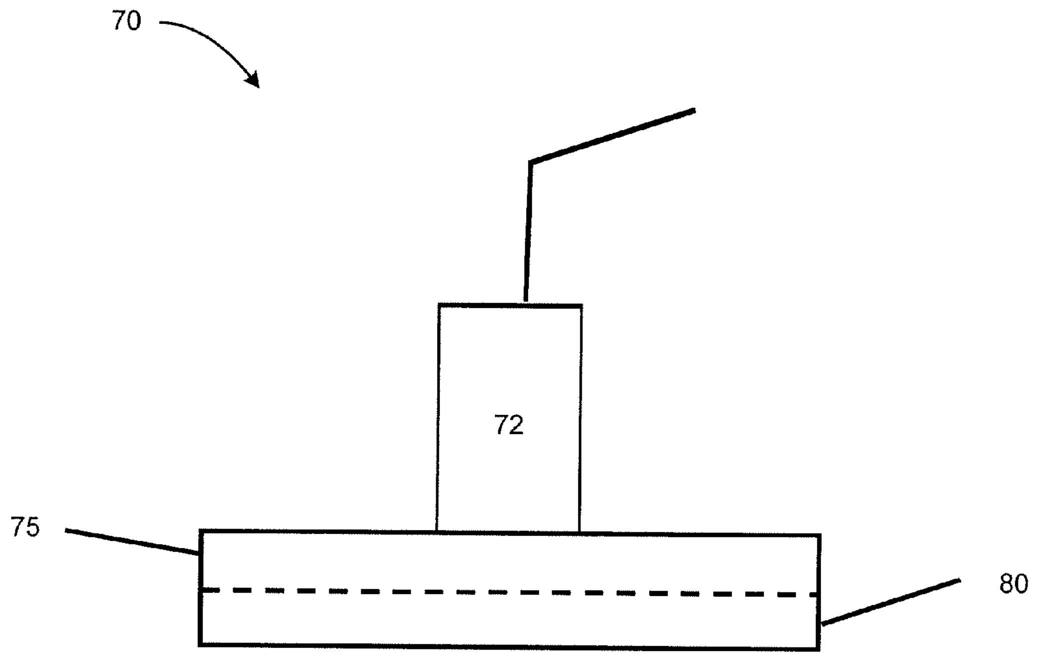
FIG. 5 shows an exemplary probe that includes a plurality of addressable transducers suitable for generating one or more shear waves, in accordance with an illustrative embodiment.

In turn, FIG. 5 is a schematic diagram that shows a shear wave generating probe 70. A housing includes various elements suitable for generating shear waves. A handle 72 is used to position the probe 70 relative to a sample of interest. The backing material 75 is proximal to the active region 80 that includes a selectively addressable transducer array. The active region may also include an acoustic lens disposed on top of the wave generating surface of the transducer array. As shown, in this embodiment a plurality of shear waves (not shown) can be being generated by the probe 70 using an array having oppositely polarized elements as described herein.

Figure 6:
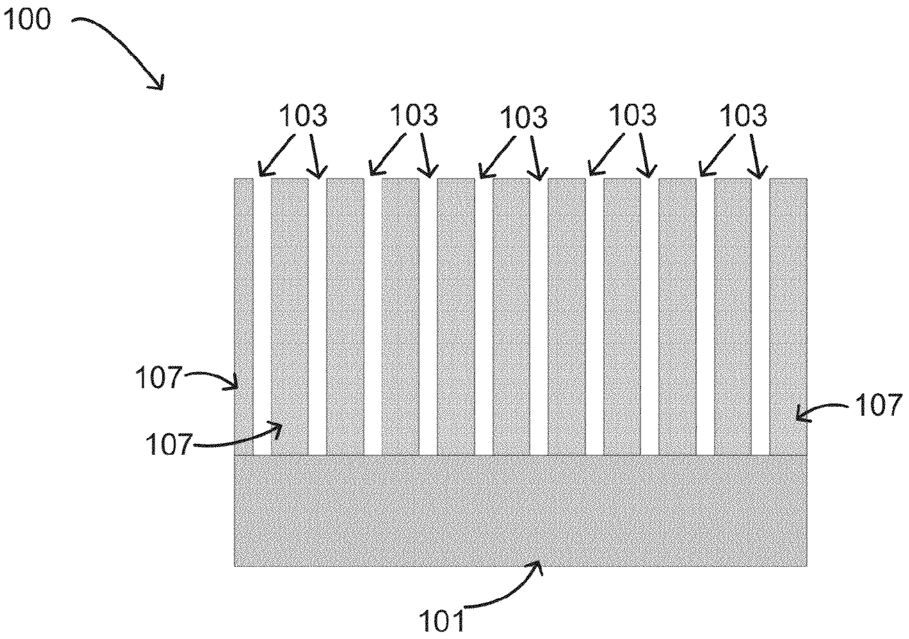
FIG. 6 shows a cross-sectional schematic of a transducer array, in accordance with an illustrative embodiment.
Figure 7:
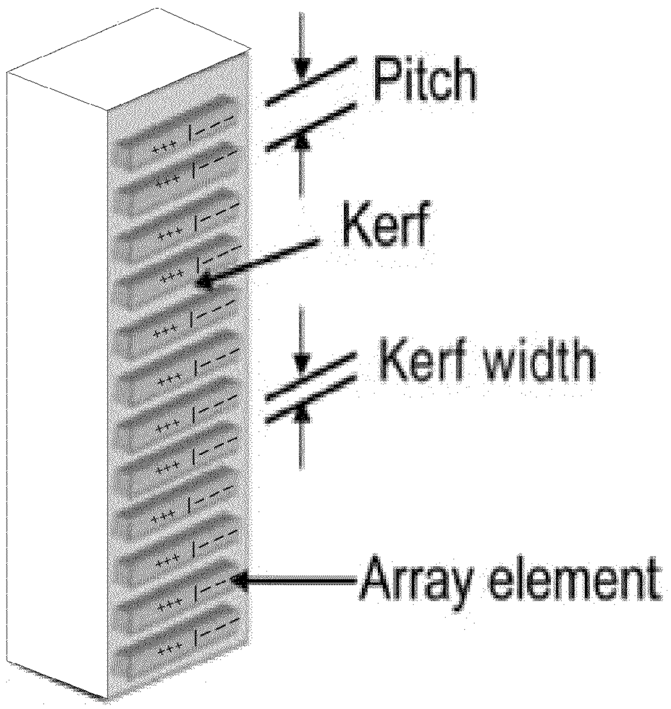
FIG. 7 shows a perspective view of a transducer array, in accordance with an illustrative embodiment.

FIG. 6 shows a side cross-section view of a transducer array 100 in the long axis (X direction), in accordance with an illustrative embodiment. The array includes a plurality of transducers 107 mounted to a backing material 101. Each of the void regions or kerf 103 are formed in a unitary block of piezoelectric material or represent spatial divisions between individual transducer elements as discussed above. In one embodiment, the void regions or kerfs 103 are filled with a polymer material. FIG. 7 shows a side perspective view of a transducer array with a two row by twelve column array. The distance between two adjacent elements is the kerf width. The pitch is the distance between the centers of two piezoelectric elements. Various array elements are shown as a pair of two piezoelectric elements in a given column.

Exemplary Manufacturing Embodiment

Figure 8:
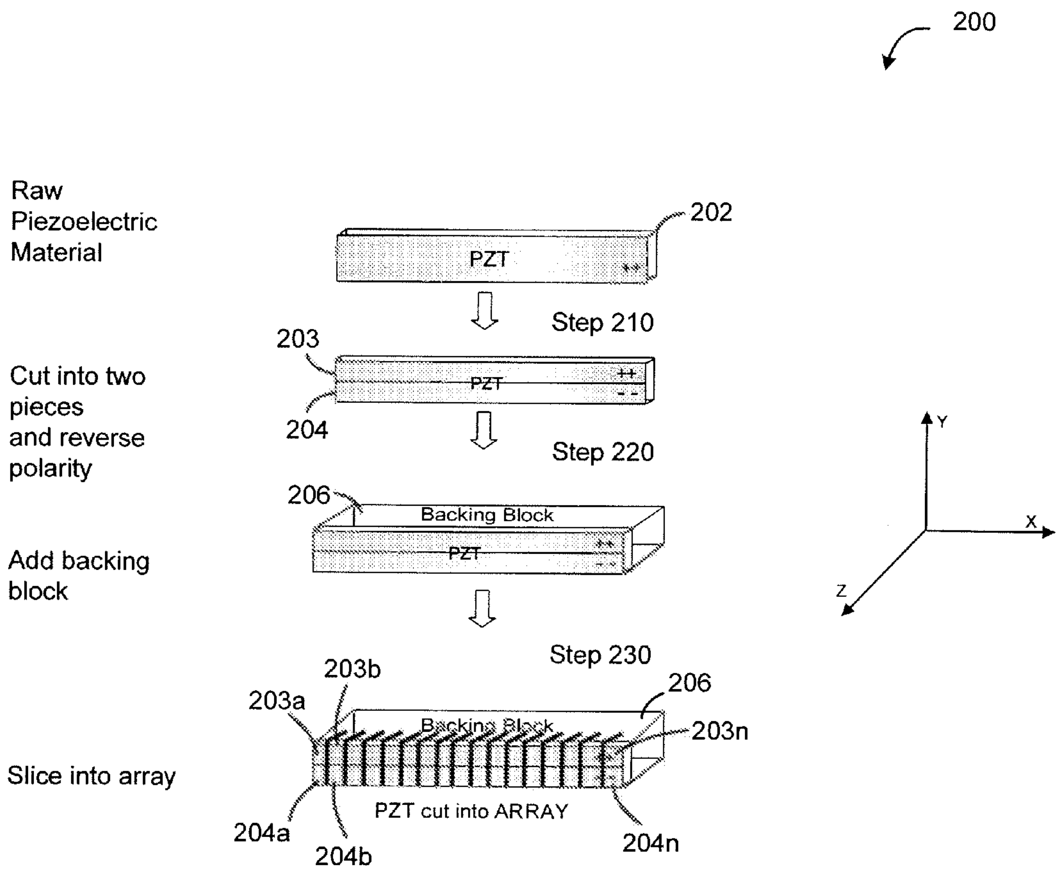
FIG. 8 shows a process flow diagram for a method of manufacturing a transducer array, in accordance with an illustrative embodiment.

Referring to FIG. 8, a method of manufacturing 200 a transducer array is shown, in accordance with an illustrative embodiment. In a first step (Step 210) a three dimensional slab of a piezoelectric material 202, for example, a PZT material, is cut in two sections. In a preferred embodiment, the slab is substantially rectangular in shape and is cut lengthwise (i.e. longitudinally) to create a first element 203 and a second element 204. Suitable devices for cutting the piezoelectric material 202 include saws, blades, chisels, etc. In one embodiment, the two elements preferably are symmetrical, but symmetry is not required. In addition, the polarity of the two elements are reversed, such that one element (e.g., 203) has a positive polarity and the other element (e.g., 204) has a negative polarity. It will be appreciated that the description of two elements 203, 204 is exemplary only and that more than one cut can be made in the piezoelectric material, such that more than two sections are generated and included in the transducer array.

In a second step (Step 220), the two elements 203, 204 are joined to a backing block material 206. In a preferred embodiment, the two elements are stacked lengthwise in a substantially parallel configuration to yield a transducer face having both a positively polarized transducer element 202 and a negatively polarized transducer element 204. In one embodiment, there is a kerf between the top and bottom sections. In another embodiment, no kerf is formed. If a kerf is formed it may be filled with a lossy material or kept unfilled. As noted above, the backing material 206 can include a lossy material to absorb the acoustic energy to increase the bandwidth of the array. The two elements 202, 204 are attached to the backing material by a suitable adhesive or mechanical attachment.

In a third step (Step 230), a plurality of traverse cuts are made through the two elements 203, 204, resulting in a transducer array having a plurality of individually polarizable transducer elements 203*a-n*, 204*a-n* which are separated by kerfs or in direct contact with each other. In a preferred embodiment, the transverse cuts are substantially parallel. Thus, in some embodiments, a plurality of columns is formed in the transducer face, and each column has a positively charged transducer element and a negatively charged transducer element. Since each transducer element is individually addressable, the polarity of each element can be modulated. Optionally, a lossy material can be disposed in one or more of the kerfs.

Low Noise Amplifier

Figure 9:
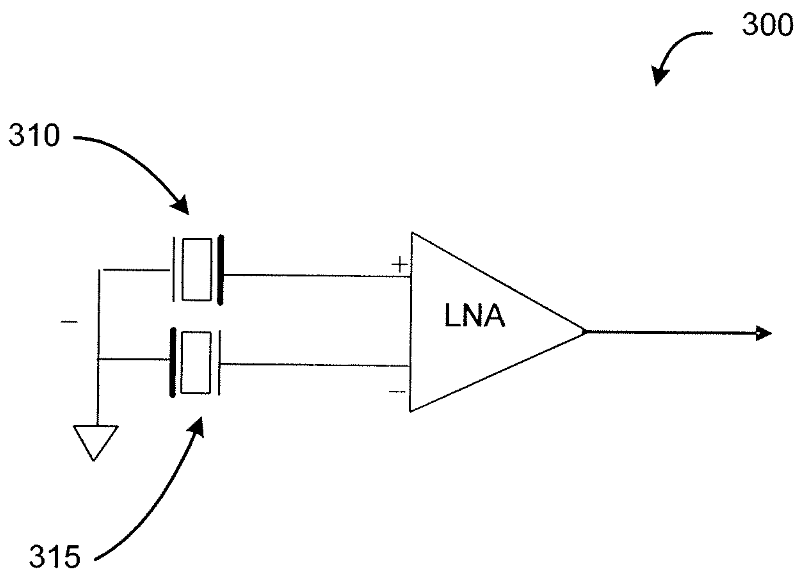
FIG. 9 shows a schematic of a low noise amplifier (LNA) integrated into a shear wave generating system, in accordance with an illustrative embodiment.

In some embodiments the ultrasound probe can include a low noise amplifier (LNA). Referring to FIG. 9, a shear wave generating system 300 having a low noise amplifier as part of a signal input receiving stage is shown. Two transducers 310 and 315 having different polarities that are part of a transducer array are shown. The low noise amplifier is used to amplify the signals that are received by the two transducer elements 310 and 315.

Elastography Embodiments

In ultrasound imaging, elastography assists in characterizing the differences in tissue elasticity. There are three different methods for elastography imaging: static or tissue compression, sono-elastography and Shear Wave elastography. In one embodiment, the invention relates to using incident shear waves and/or a resultant shear wave that is received by the array after it propagates in a sample of interest. One or more of these waves are used to determine a property of interest such as an elasticity measurement.

In the case of static or tissue compression elastography, the transducer is used to compress the tissue, and the strain is calculated with the correlation function. This calculation gives a superimposed color map, on top of the B mode image, which represents tissue elasticity. This technique largely depends on the manual compression that is applied to the transducer and is difficult to reproduce, and is not quantitative but qualitative.

In sono-elastography, there is another vibration source (normally 100-1000 Hz) applied to the tissue while performing the Color Doppler imaging. The harder tissue gives less resonance and generates lower Doppler shifting.

Unlike the methods mentioned above, which rely on operator compression or a mechanical vibrator, another method uses the technique in which the shear waves travel through tissues at right angles from the ultrasound beam and slow down in proportion to the stiffness of the tissue through which they pass. The image is acquired and turned into color coded maps of tissue elasticity.

In one embodiment, a shear wave is generated by a plurality of transducers. In turn, the propagation speed in the tissue of this shear wave is measured. The speed at which the shear wave propagates is proportional to the square root of the tissue elasticity. In order to follow the shear wave propagation (speed of about 1 to about 2 m/s), the shear wave generators described herein can be used.

Shear wave elastography uses the acoustic radiation force of the ultrasound wave to push the tissue, like an acoustic puff or impulse. This acoustic push is achieved by sending repeated focused pulses down the intended push line, each with a longer pulse length than is optimum for imaging; in fact, they are similar to the pulses used for color Doppler imaging and are generated with a conventional transducer. The push pulses follow closely upon each other such that the speed of travel of the resulting push is faster than the speed of sound in tissue. In turn, this supersonic push generates a sonic shock that amplifies the effect of the push beam. The to-and-fro particle motion that is generated triggers a conical shear wave that travels sideways away from the push line.

In one embodiment, the shear wave is generated by the arrangement on the transducer and excitation pulse. Given the variables available to an operator, the embodiments described herein allow shear waves to be generated that have desirable wave characteristics for the different elastography techniques described herein.

The present invention may be embodied in may different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, transducer control circuits, integrated circuitry (e.g., an Application Specific Integrated Circuit (ASIC)), or any other means including any combination thereof. In a typical embodiment of the present invention, predominantly all of the communication between the transducer array in the probe and a control system is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). The embodiments described herein may use any suitable input device or controller to allow an operator to change transducer polarity or other shear wave specific parameters.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), or preloaded with a computer system (e.g., on system ROM or fixed disk).

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

What is claimed is:

1. A shear wave generator comprising:

a first piezoelectric element having a first polarity in electrical communication with a first electrode pair;

a second piezoelectric element having a second polarity in electrical communication with a second electrode pair, wherein the second polarity is an inverse of the first polarity;

a boundary layer disposed behind both the first piezoelectric element and the second piezoelectric element; and an excitation signal generator in electrical communication with the first electrode pair and the second electrode pair, wherein the first piezoelectric element vibrates in a first direction and the second piezoelectric element vibrates in a second direction in response to an excitation signal, wherein the first piezoelectric element has a first wave generating surface and the second piezoelectric element has a second wave generating surface, the first and second wave generating surfaces aligned and sized such that a shear wave is generated in response to an excitation signal, wherein the shear wave has a direction of vibration perpendicular to a wave direction of the shear wave.

2. The shear wave generator of claim 1 wherein the piezoelectric elements are disposed within an ultrasound imaging probe and wherein the first piezoelectric element vibrates in a first direction and the second piezoelectric element vibrates in a second direction in response to the excitation signal, the second direction opposite the first direction.

3. The shear wave generator of claim 1 wherein the boundary layer comprises a lossy material.

4. The shear wave generator of claim 3 wherein the lossy material comprises a high acoustic attenuation material.

5. The shear wave generator of claim 1 wherein the first piezoelectric element and the second piezoelectric element are positioned to define a kerf therebetween.

6. The shear wave generator of claim 1 further comprising a plurality of the first and second piezoelectric elements arranged to form an array having rows and columns, each row and column comprising a plurality of the first and second piezoelectric elements, wherein at least two of the columns define a kerf therebetween.

7. A shear wave generator comprising:

a first transducer comprising a plurality of piezoelectric elements having a first polarity;

a second transducer comprising a plurality of piezoelectric elements having a second polarity, wherein the second polarity is an inverse of the first polarity, wherein the first transducer and the second transducer are adjacent and disposed in a first row;

a third transducer comprising a plurality of piezoelectric elements having the first polarity;

a fourth transducer comprising a plurality of piezoelectric elements having the second polarity, wherein the third transducer and the fourth transducer are adjacent and disposed in a second row;

a boundary layer disposed behind the first transducer, the second transducer, the third transducer and the fourth transducer, wherein the boundary layer comprises a lossy material;

a shear wave generating surface defined by a surface of each of the first transducer, the second transducer, the third transducer and the fourth transducer; and an excitation signal generator in electrical communication with the first transducer, the second transducer, the third transducer and the fourth transducer, wherein the piezoelectric elements having a first polarity vibrate in a first direction and the piezoelectric elements having a second polarity vibrate in a second direction in response to an excitation signal, wherein opposing movement of regions of the shear wave generating surface generate a shear wave in response to an excitation signal.

8. The shear wave generator of claim 7 wherein the first transducer, the second transducer, the third transducer and the fourth transducer are disposed within an ultrasound imaging probe.

9. The shear wave generator of claim 7 wherein the piezoelectric elements having the first polarity vibrate in a first direction and the piezoelectric elements having the second polarity vibrate in a second direction in response to the excitation signal, the second direction opposite the first direction.

* * * * *